US008047350B2

(12) United States Patent
Ruehrup et al.

(10) Patent No.: US 8,047,350 B2
(45) Date of Patent: Nov. 1, 2011

(54) FRICTION LINING

(75) Inventors: Vera Ruehrup, Hamm/Sieg (DE);
Oliver Runge, Wissen (DE); Christian Spandern, Elkenroth (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/760,677

(22) Filed: Apr. 15, 2010

(65) Prior Publication Data

US 2010/0227150 A1 Sep. 9, 2010

Related U.S. Application Data

(63) Continuation of application No. PCT/DE2008/001613, filed on Sep. 29, 2008.

(30) Foreign Application Priority Data

Oct. 16, 2007 (DE) .......................... 10 2007 049 739

(51) Int. Cl.
*F16D 69/02* (2006.01)

(52) U.S. Cl. ................................. 192/107 M

(58) Field of Classification Search ........................ None
See application file for complete search history.

(56) References Cited

U.S. PATENT DOCUMENTS

| 3,030,215 A | | 4/1962 | Veatch et al. | |
|---|---|---|---|---|
| 3,841,452 A | * | 10/1974 | Newsock et al. | 192/107 R |
| 5,534,348 A | * | 7/1996 | Miller et al. | 428/402 |
| 6,316,086 B1 | * | 11/2001 | Beier et al. | 428/293.4 |

FOREIGN PATENT DOCUMENTS

| CA | 987 423 X | 4/1976 |
|---|---|---|
| DE | 29 25 265 X | 1/1981 |
| DE | 197 12 203 A | 10/1997 |
| DE | 44 31 642 A | 5/2007 |
| EP | 0 513 769 X | 11/1992 |
| JP | 59 081340 X | 5/1984 |
| JP | 63 195438 X | 8/1988 |
| JP | 63 293336 X | 11/1988 |
| JP | 1216135 X | 8/1989 |

OTHER PUBLICATIONS

Machine translation of DE 2925265 A1, downloaded from EPO website on Apr. 21, 2011. http://translationgateway.epo.org/emtp/gw/?ACTION=description-retrieval&OPS=ops.epo.org&LOCALE=en_EP&FORMAT=docdb&COUNTRY=DE&NUMBER=2925265&KIND=A1&T=1.*
Potters Hollow and Solid Glass Spheres, downloaded from The Cary Company website on Apr. 21, 2011. http://www.thecarycompany.com/products/potters.html.*

* cited by examiner

*Primary Examiner* — Richard M. Lorence
(74) *Attorney, Agent, or Firm* — Lucas & Mercanti, LLP

(57) ABSTRACT

A friction lining, particularly a clutch friction lining for transmitting torque from an engine to a transmission.

14 Claims, No Drawings

FRICTION LINING

This application is a continuation application of PCT/DE2008/001613 filed Sep. 29, 2008, which in turn claims the priority of DE 10 2007 049 739.5 filed Oct. 16, 2007, the priority of these applications is hereby claimed and these applications are incorporated by reference herein.

The invention relates to a friction lining, in particular a clutch friction lining, according to the preamble of claim 1.

Clutch linings of this type are used, in particular, for friction clutches in vehicles. In this context, they were firmly bonded to a metallic carrier plate or riveted onto a clutch disk, in order to allow torque to be transmitted between an engine and a transmission in conjunction with a running partner, in the coupled state, or to decouple this torque transmission when the clutch is open.

DE 44 31 642 B4 discloses a friction lining which contains, inter alia, fibers, binders, fillers and hollow microspheres as constituents. Hollow microspheres of this type accrue as combustion residues during processes in coal-fired power plants. Hollow-sphere-shaped structures are produced in these processes as a result of the inclusion of air.

DE 197 12 203 A1 discloses a friction lining, in which carrier elements are embedded, and the associated production process.

It has become apparent that friction linings according to the prior art, particularly in interaction with a pressing-on or pressure plate, cause an appreciable amount of wear on the running partners.

Therefore, the object of the invention is to propose a friction lining which improves the wear aspect on the running partner.

This object is achieved by a friction lining having the features of claim 1.

It has been shown that the use of the hollow glass spheres of borosilicate glass according to the invention in a friction lining results in a considerable reduction of the wear on the running partner.

In a preferred embodiment, the amount by weight of the hollow glass spheres is 2 to 15% of the weight of the friction lining.

In a further preferred embodiment, the diameter of the hollow glass spheres is less than 300 micrometers.

In one advantageous embodiment, the wall thickness of the hollow glass spheres is between 5 and 50%, particularly preferably 10% of the sphere radius, in order to obtain a desired density of the hollow glass spheres.

A further advantageous embodiment is obtained if the hollow glass spheres have an isostatic pressure stability of more than 10 MPa.

A further advantageous embodiment provides for the hollow glass spheres to have a Mohs hardness of less than 5, preferably 3 to 4.

In a further preferred embodiment, the hollow glass spheres have a density of 0.6 to 0.8 g/cm$^3$, preferably 0.7 g/cm$^3$, in order to provide the friction lining with a desired density.

In a further advantageous embodiment, the hollow glass spheres have a melting point of between 500° C. and 700° C., preferably 600° C.

A further advantageous embodiment is obtained when the hollow glass spheres consist of 50 to 80% by weight $SiO_2$, less than 20% by weight $Al_2O_3$, in each case less than 5% by weight $Fe_2O_3$, $TiO_2$, $K_2O$ and CaO, 2 to 20% by weight $B_2O_3$ and 20 to 40% by weight $Na_2O$, preferably of 60 to 70% by weight $SiO_2$, less than 5% by weight $Al_2O_3$, in each case less than 1% by weight $Fe_2O_3$, $TiO_2$, $K_2O$ and CaO, 2 to 10% by weight $B_2O_3$ and 20 to 35% by weight $Na_2O$.

A further preferred embodiment provides for at least one friction lining carrier means to be embedded in the friction lining. However, the amounts given in percentage by weight in the present patent application always relate to the friction lining without the friction lining carrier means.

An embodiment according to which the friction lining is firmly bonded to at least one friction lining carrier means is also advantageous.

A further preferred embodiment is obtained when the friction lining consists of 10 to 40% by weight resin, 5 to 20% by weight rubber, 0.5 to 3% by weight vulcanization additives, 8 to 20% by weight glass, 10 to 30% by weight baryte, 5 to 15% by weight carbon black, 0 to 10% by weight coke, 0 to 5% by weight graphite and 5 to 15% by weight metal, where the glass consists of glass fibers and/or ground glass and 2 to 10% by weight hollow glass spheres.

The description which follows describes further advantages and advantageous refinements of the invention.

The friction lining according to the invention can be produced in a simple manner because the production processes known from the prior art can, in principle, be retained. However, it is necessary to add hollow glass spheres of borosilicate glass according to the invention to the mixture. By way of example, the mixture may contain the following: 10 to 40% by weight resin, consisting of phenolic and melamine resin, 5 to 20% by weight NBR rubber, 0.5 to 3% by weight vulcanization additives, 8 to 20% by weight glass, consisting of glass fibers and/or ground glass and the hollow glass spheres according to the invention, 10 to 30% by weight baryte, 5 to 15% by weight carbon black, where it is possible to use varieties of carbon black which have surfaces of differing sizes, 0 to 10% by weight coke, 0 to 5% by weight graphite and 5 to 15% by weight metal, in particular copper or brass. The hollow glass spheres of borosilicate glass according to the invention are preferably present in the mixture in an amount of 2 to 15% by weight.

A mixer can be used for mixing such that the ingredients are subsequently present in a homogeneously distributed manner. During mixing, it is not necessary to observe a certain order when adding the constituents. It is also possible to add all the materials to the mixer at the same time.

The hollow glass spheres of borosilicate glass according to the invention preferably consist of 60 to 70% by weight $SiO_2$, less than 5% by weight $Al_2O_3$, in each case less than 1% by weight $Fe_2O_3$, $TiO_2$, $K_2O$ and CaO, 2 to 10% by weight $B_2O_3$ and 20 to 35% by weight $Na_2O$.

The hollow glass spheres of borosilicate glass according to the invention preferably have an outside diameter of less than 300 micrometers. Here, these spheres can all be present substantially in the same size, although they may also be subjected to grain size distribution. The inside diameter of the hollow glass spheres is selected such that the wall thickness of the hollow glass spheres is between 5 and 50% of the sphere radius. Here, particular preference is given to a wall thickness of about 10%. The hollow glass spheres have an isostatic pressure stability of more than 10 MPa. The isostatic pressure stability of the hollow glass spheres is determined in a liquid. The hollow glass spheres have a Mohs hardness of preferably 3 to 4, a density of preferably 0.7 g/cm$^3$ and a melting point of preferably 600° C.

Unlike in the case of hollow microspheres of combustion residues, the sphere walls of which were often opaque, milky, flawed and porous, the sphere walls of the hollow glass spheres of borosilicate glass are transparent and non-porous. The targeted process for producing the hollow glass spheres of borosilicate glass additionally provides an overall product quality which remains the same.

One preferred embodiment provides for a friction lining carrier means—also referred to as lining carrier or friction lining carrier within the context of this application—to be embedded in the friction lining. By way of example, this may be implemented by metering the mixture of the friction material into a hot-press, then placing a lining carrier in the press and subsequently metering in further material, before the material, together with the lining carrier, is shaped into its final condition, for example by hot-pressing.

It may also be advantageous if the lining carrier provided with a spacer device is first introduced into the mold, then the friction material is metered in and, during the pressing operation, for example a hot-pressing operation, the material flows through holes in the lining carrier into the region underneath the lining carrier.

In addition, the friction lining mays be designed in such a way that the friction lining layer upstream of the lining carrier (front side) has another, different material mixture than the friction lining layer downstream of the lining carrier (rear side). The friction lining layer upstream of the lining carrier (front side) comprises the actual friction surface, and the friction lining layer downstream of the lining carrier preferably does not serve as the friction surface. As a result, a material mixture which does not have to satisfy the high requirements in terms of the coefficient of friction can be used for the lining mixture downstream of the lining carrier (rear side). This material may also preferably have a lower density, so that the weight and the moment of inertia of the friction lining are reduced. A higher density may also be required on the rear side for specific purposes. This can be achieved, for example, by the varied addition of the hollow glass spheres according to the invention. Likewise, the rear side may also be produced with a higher proportion of the less-expensive constituents.

Depending on the material selection and the intended use, the rear side of the friction lining may also be chosen to be thinner or thicker than the front side.

In addition, it may be advantageous to subject the lining carrier to surface treatment in order to improve the adhesion of the lining material. In this context, reference is made to DE 197 12 203 A1, filed by the applicant.

In a further preferred embodiment, the friction lining is firmly bonded to a friction lining carrier. This may take place as early as during the production of a blank and/or during the hot-pressing operation. During the hot-pressing operation, the lining carrier and the friction lining are caked together. It is expedient if at least that side of the lining carrier which is bonded to the lining is pretreated, for example etched and/or sand-blasted.

Furthermore, it may be expedient if the friction lining carrier is coated with a bonding agent. In this context, reference is made to DE 44 31 642 B4, filed by the applicant.

In one preferred embodiment, the friction lining according to the invention is produced in the following way: after the constituents of the friction lining have been mixed homogeneously in a mixer, a predefined amount of this mixture is introduced into a preforming mold, distributed uniformly therein and then pre-compacted to form a blank. The blank is placed in a hot-pressing mold and pressed to the desired shape by a hot-pressing operation, the blank being compacted further. The friction lining can then be subjected to aftertreatment, for example hardened, ground and drilled.

The invention claimed is:

1. A clutch friction lining, comprising:
   at least one layer containing at least hollow glass spheres,
   wherein the hollow glass spheres consist of borosilicate glass,
   wherein the hollow glass spheres account for an amount by weight of 2 to 15% of the weight of the friction lining,
   wherein the hollow glass spheres have a diameter of less than 300 micrometers, and
   wherein the wall thickness of the hollow glass spheres is between 5 and 50% of a sphere radius.

2. The friction lining of claim 1, wherein the hollow glass spheres have an isostatic pressure stability of more than 10 MPa.

3. The friction lining of claim 2, wherein the hollow glass spheres have a Mohs hardness of less than 5.

4. The friction lining of claim 2, wherein the hollow glass spheres have a Mohs hardness of 3 to 4.

5. The friction lining of claim 3, wherein the hollow glass spheres have a density of 0.6 to 0.8 g/cm$^3$.

6. The friction lining of claim 3, wherein the hollow glass spheres have a density of 0.7 g/cm$^3$.

7. The friction lining of claim 5, wherein the hollow glass spheres have a melting point of between 500° C. and 700° C.

8. The friction lining of claim 5, wherein the hollow glass spheres have a melting point of 600° C.

9. The friction lining of claim 7, wherein the hollow glass spheres consist of 50 to 80% by weight $SiO_2$, less than 20% by weight $Al_2O_3$, less than 5% by weight $Fe_2O_3$, $TiO_2$, $K_2O$ and CaO, 2 to 20% by weight $B_2O_3$ and 20 to 40% by weight $Na_2O$.

10. The friction lining of claim 7, wherein the hollow glass spheres consist of 60 to 70% by weight $SiO_2$, less than 5% by weight $Al_2O_3$, less than 1% by weight $Fe_2O_3$, $TiO_2$, $K_2O$ and CaO, 2 to 10% by weight $B_2O_3$ and 20 to 35% by weight $Na_2O$.

11. The friction lining of claim 1, wherein at least one friction lining carrier means is embedded in the friction lining.

12. The friction lining of claim 1, wherein the friction lining is firmly bonded to at least one friction lining carrier means, 13. The friction lining of claim 1, wherein the friction lining consists of 10-40% by weight resin, 5-20% by weight rubber, 0.5-3% by weight vulcanization additives, 8-20% by weight glass, 10-30% by weight baryte, 5-15% by weight carbon black, 0-10% by weight coke, 0-5% by weight graphite and 5-15% by weight metal, where the glass consists of glass fibers and/or ground glass and 2-15% by weight hollow glass spheres.

14. The friction lining of claim 1, wherein the wall thickness of the hollow glass spheres is 10% of a sphere radius.

* * * * *